United States Patent [19]

Knechtel

[11] 4,110,030

[45] Aug. 29, 1978

[54] ELECTROSTATIC COPYING APPARATUS

[75] Inventor: Wilhelm Knechtel, Biebertal, Fed. Rep. of Germany

[73] Assignee: Canon Kabushiki Kaisha, Tokyo, Japan

[21] Appl. No.: 686,361

[22] Filed: May 14, 1976

[30] Foreign Application Priority Data

May 20, 1975 [DE] Fed. Rep. of Germany ....... 2522264

[51] Int. Cl.² .................... G03G 15/00; B65H 29/66
[52] U.S. Cl. .......................... 355/11; 271/65; 355/3 SH; 355/24
[58] Field of Search .............. 355/3 R, 3 SH, 8, 11, 355/23, 24, 25; 271/65, 185, DIG. 9

[56] References Cited

U.S. PATENT DOCUMENTS

| | | | |
|---|---|---|---|
| 3,227,444 | 1/1966 | Egan | 355/23 X |
| 3,506,347 | 4/1970 | Carlson | 355/3 R |
| 3,675,999 | 7/1972 | Komori et al. | 355/23 X |
| 3,790,272 | 2/1974 | Knechtel et al. | 355/8 X |
| 3,833,296 | 9/1974 | Vola et al. | 355/8 X |
| 3,873,189 | 3/1975 | Whitaker et al. | 355/55 X |
| 3,980,406 | 9/1976 | Lang | 355/24 |

*Primary Examiner*—Fred L. Braun
*Attorney, Agent, or Firm*—Fitzpatrick, Cella, Harper & Scinto

[57] ABSTRACT

In a copying apparatus, a sheet original exposure unit is provided which has an exposure window for exposing a sheet original therethrough, and a transport device for transporting the sheet original through the exposure window. The exposure window and the transport device are rotatable together. Optical elements are provided including a lens and mirrors for projecting the image of the sheet original upon a photosensitive medium, and a driving mechanism is provided which utilizes the rotation of the sheet original exposure unit to drive the transport device in the opposite direction so as to enable the back side of the sheet original to be exposed.

5 Claims, 3 Drawing Figures

ELECTROSTATIC COPYING APPARATUS

BACKGROUND OF THE INVENTION

1. Field of the Invention

This invention relates to a copying apparatus in which a sheet-like original transport unit is rotatable for repeated exposure of the sheet-like original. More particularly, it relates to a copying apparatus capable of copying both sheet-like originals and book-like originals in which the sheet-like original transport unit is rotatable to permit both sides of sheet-like originals to be copied continuously.

2. Description of the Prior Art

The copying apparatus of the type in which a book-like original may be placed in position on an original carriage and scanned in the lateral direction by an image-forming optical system has an advantage that does not require great dimensions for allowing movement of the original carriage, unlike the copying apparatus of the movable original carriage type. However, where a book-like original is to be copied, the copying apparatus of such type requires the image-forming optical system to be returned to its initial position during each exposure of the original and thus, it is disadvantageous in that the time required for copying is sharply increased particularly when multiple copies are desired.

Therefore, such a scanning method has been used chiefly for the exposure of book-like originals and not sheet-like originals. In contrast, sheet-like originals are guided through a reading window by a transport roll mechanism and this can be done continuously. During the copying of sheet-like originals, the image-forming optical system remains stationary as a rule. The optical system is used for the copying of book-like and sheet-like originals. The image-forming optical system is usually movable only along the scanning stroke and therefore, when the copying method (book copy or sheet copy) is changed, the apparatus must be prepared for such change. In the known apparatus, the book-like original carriage is designed for movement with the sheet-like original transport mechanism and thus, when sheet-like originals are to be copied, the image-forming window for sheets is positioned at the starting point of the scanning stroke. For the book copy, the book-like original carriage and the sheet transport mechanism are again returned to their initial positions. Such system requires undesirable expenses.

Also, where both sides of a sheet original are to be copied, termination of the first scanning must be followed by the transport of the sheet original to the same sheet transport mechanism. This is time-consuming.

SUMMARY OF THE INVENTION

An object of the present invention is to use simple means to enable a book-like or a sheet-like original to be selectively copied by optical means provided within the apparatus. However, the present invention does not preclude the provision of a copying apparatus having a movable carriage.

According to the present invention, such object may be achieved by a construction in which the book-like original carriage and the sheet transport mechanism are securely mounted in the apparatus and a group of movable mirrors is removed from the necessary scanning stroke for book copy of a control mechanism while at least a mirror group or a mirror is preferably engaged with mechanical means, which in turn retracts the mirror group or the mirror from the optical path.

In such a construction, a securely mounted lens is designed to directly focus the original image appearing in the exposure window without the use of the movable mirror employed in the scanning method, and the scanning is effected by the use of an inserted mirror or mirror group.

In a special embodiment, part of the mirror group is comprised of a single mirror. In the special embodiment, the single mirror is pivotally retained on an axis perpendicular to the direction of movement thereof and when retracted from the scanning stroke, the mirror is engaged with a member which holds the mirror out of the image-forming optical path. No second mirror group is provided between the exposure window for sheet-like original and the lens. The optical axis of the lens may be made to directly face the exposure window for sheet-like original and thus, the lens directly focuses the original image appearing in the window.

Another object of the present invention is to enable both sides of sheet-like originals and of book-like originals to be copied, and particularly to enable both-side copying of sheet-like originals to be effected more quickly than in the past.

In the apparatus according to the present invention, an original image is exposed on a rotatable drum to form a dust image thereon, which is then transferred onto plain paper and fixed thereon, whereby both-side copy may be obtained as a rule. More specifically, the paper on which an image has already been formed is introduced into the apparatus by a suitable method and for the second time, the back side of the paper is brought into contact with the drum, whereby a second image may be formed on the back side of the paper.

However, the production of both-side copy is important only when an original having images on both-sides thereof is exposed. In such a case, the original must be reversed after exposure of one side thereof and again introduced into the apparatus, and this is cumbersome.

Therefore, the present invention further provides a copying apparatus having a transport mechanism for turning the sheet-like original through 180°. The transport mechanism usually comprises two pairs of rolls disposed before and behind the exposure window. Further, according to the present invention, a control device is provided for reversing the rotation of the transport roll pairs before the original leaves the roll pair adjacent the exit and as the result, the rolls after reversal of the rotation thereof transport the original again through the exposure window to permit the back side of the original to be exposed.

However, such transport mechanism is not only applicable to the both-side copying apparatus but also to the copying apparatus of the type in which the images on the both sides of a sheet original are formed on separate sheets of plain paper or sensitive paper.

The present invention also provides a sheet original transport mechanism of very simple construction which is applicable to the image transfer-fixation type copying apparatus as well as the so-called fax type copying apparatus.

The above objects and other features of the present invention will become fully apparent from the following detailed description taken in conjunction with the accompanying drawings.

DESCRIPTION OF THE PREFERRED EMBODIMENTS

The invention will first be described with respect to an embodiment shown in FIG. 1.

Figure 1:
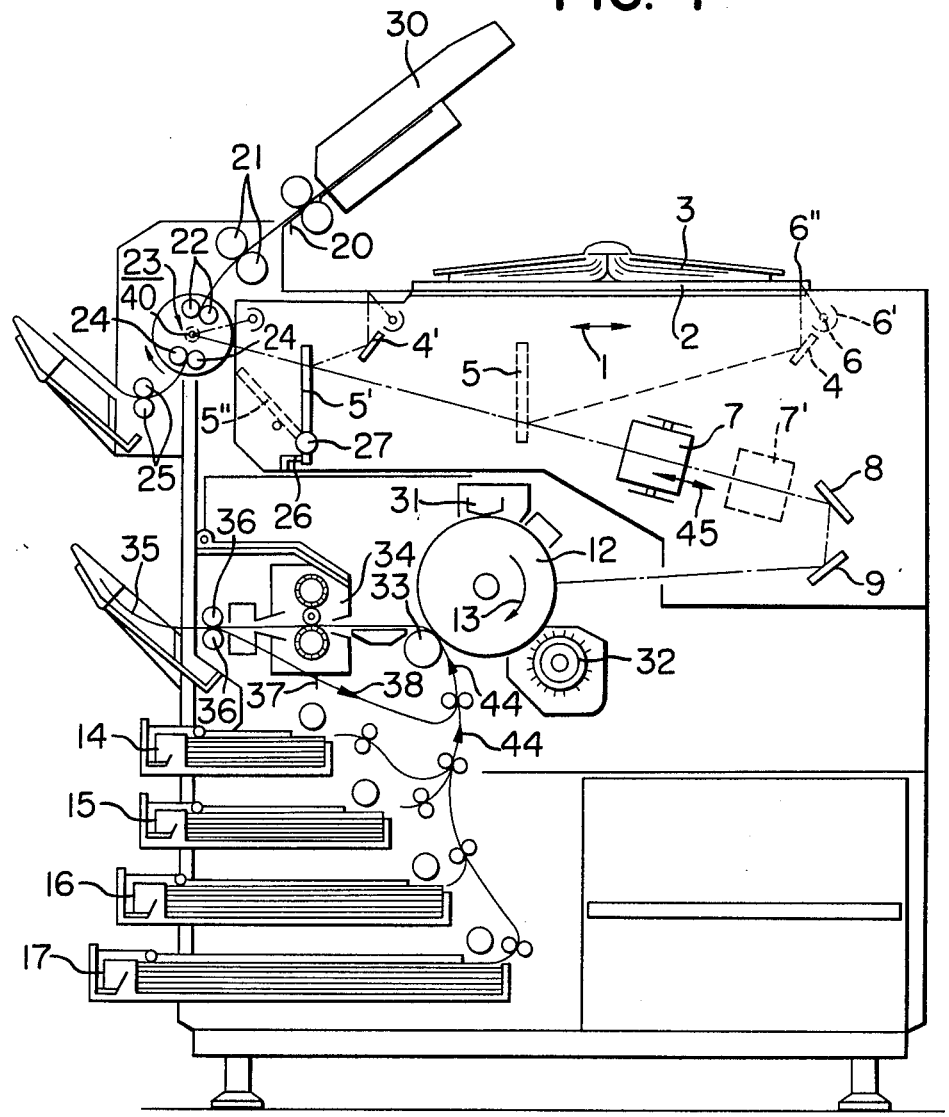
FIG. 1 is a cross-sectional view showing an embodiment of the present invention as applied to a copying apparatus of the stationary book-original carriage type.

FIG. 1 shows a copying apparatus in which a movable image-forming optical system scans an image original in the lateral direction to thereby enable exposure of the image original (book original) positioned in place on the apparatus and in which a sheet-like image original is continuously movable relative to a stationary image-forming optical system by a moving mechanism for exposure, the image-forming lens being stationary and a group of two mirrors being movable at different velocities to compensate for the length of the optical path during exposure of the book original.

A book original 3 is placed on a transparent book carriage 2 secured to the apparatus. The image-forming optical system movable in the direction of arrow 1 comprises illumination means 6 which illuminates a narrow area 6" of the surface of the original 3 to be illuminated with the aid of a mirror 6'. A mirror 4 deflects the light from the illuminated area 6" toward a mirror 5, which in turn deflects the light toward a lens 7 securely mounted within the apparatus. The lens 7 focuses the light beam 6" upon a rotatable photosensitive drum 12 via mirrors 8 and 9. The drum 12 is rotated in the direction of arrow 13 and in synchronism with the movable mirror, as a result of which an electrostatic latent image corresponding to the original image is formed on the peripheral surface of the drum 12. Disposed around the drum 12 are developing means and transfer means so that the original image is reproduced on the paper which is brought into contact with the drum 12.

The lens 7 is securely mounted as already mentioned. The mirrors 4 and 5 are moved at different velocities during exposure of the original image. The mirror 4 is moved at a velocity double the velocity of the mirror 5, so that the length of the optical path between the illuminated area 6" and the lens 7 is maintained constant.

If it is desired to change the magnification, the lens 7 may be moved in the direction of arrow 45 to assume, for example, a dot-line position 7'. Nevertheless, exposure may take place just in the same manner as described above.

In accordance with the size of the image original and/or the desired magnification, paper sheets of corresponding size may be selectively fed from different cassettes 14, 15, 16 and 17.

During exposure of a sheet-like image original, such original is transported along a guide surface 20 by pairs of transport rolls 21, 22, 24 and toward an exposure window 23. After the exposure has been effected, the sheet-like original is discharged by a pair of transport rolls 25.

In the exposure window 23, the sheet-like original can travel continuously, whereas during exposure of the book-like original resting on the transparent original carriage 2, it is imperative that the mirrors 4 and 5 be back to their starting points. Therefore, exposure of the sheet-like original may experience undesirable delay.

During exposure of the sheet-like original passing through the exposure window 23, the mirrors 4 and 5 are moved to their retracted positions 4' and 5', respectively, by an unshown control device. These positions are not used during the scanning of the book-like original.

In the position 5', the mirror engages a member 26, which pivots the mirror about an axis 27 perpendicular to the plane of the drawing sheet, thus moving the mirror to a dot-line position 5". Accordingly, the lens causes the original image portion appearing in the exposure window 23 to be directly focused on the drum 12 without the intermediary of the mirrors 4 and 5.

A known automatic feeder 30 may be provided to cause various image originals to pass continuously through the exposure window 23.

Usually, the drum 12 is a selenium drum and electrostatically charged by a corona 31. By the exposure of the drum surface, an electrostatic latent image corresponding to the original image is formed on the outer periphery of the drum. The developing device, for example, a magnet roll 32, scatters toner over the surface of the drum 12 and a visible image is formed on the surface of the drum 12. Paper supplied from any of the cassettes 14–17 is brought into contact with the drum 12 by a roll 33 to effect the transfer of the developing dust (toner). The toner is fixed by a fixing device 34 and a stable image is thus formed on the paper. The paper is in contact with the drum 12 and moved in the direction of arrow 44. While the paper reaches a position 35 and is being grasped by transport rollers 36, the paper is moved along a deflected path 37 in the direction of arrow 38 and again moved toward the drum 12. Thus, this time, the back side of the paper contacts the drum 12. In other words, the image of the original is formed on the front and back sides of the paper fed from the cassette.

Such both-side copy is important only when the both sides of the original are exposed. In principle, the sheet-like original may correspondingly be passed through the exposure window, but this method is cumbersome.

Therefore, in the present invention, the pairs of transport rolls 22 and 24 are designed for rotation through 180° about an axis 40 perpendicular to the direction of movement of the original. The original first passes through the exposure window 23 to effect the exposure of its front side, and then the trailing end thereof is held by the rolls 24 with the aid of an unshown control device. Subsequently, the rolls 22 and 24 are rotated and the rolls 24 occupy the position of the rolls 22 while the rolls 22 reach the position of the rolls 24. The direction of rotation of the transport rolls is reversed so that the original again passes through the exposure window 23, but the back side thereof is facing the lens 7 and thus, the back side of the original is now exposed on the drum 12.

Figure 2:
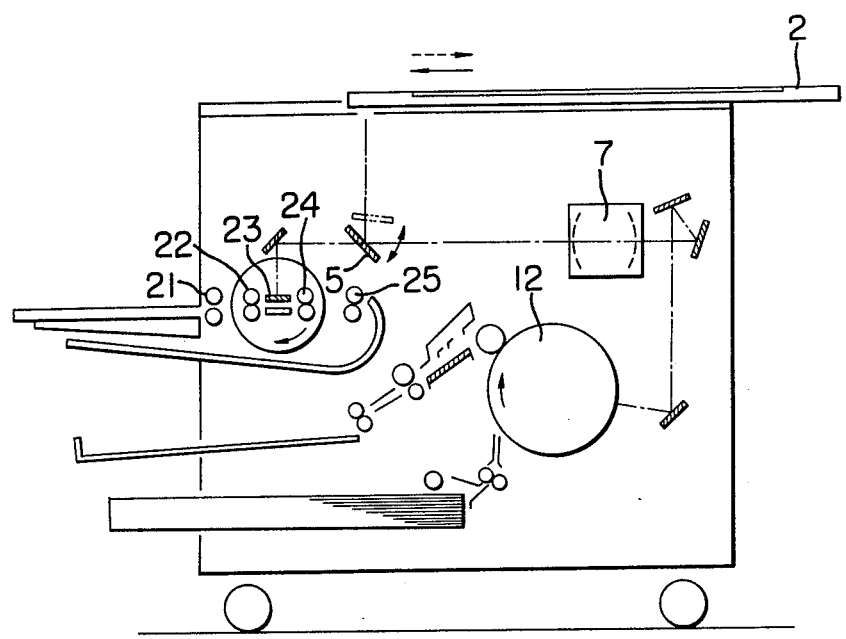
FIG. 2 is a cross-sectional view showing an embodiment of the present invention as applied to a copying apparatus of the movable book-original carriage type.

FIG. 2 shows a cross-section of a copying apparatus of the reciprocable book-original carriage type to which the present invention is applied.

Again in this embodiment, the change-over between a sheet-like original and a book-like original is accomplished by retracting the mirror 5 from the optical path.

However, this embodiment is similar to the previous embodiment in that the change-over is not restricted to the retraction of the mirror from the optical path but essentially, it may be accomplished by changing over the optical path for the sheet-like original or the book-like original.

Although the present embodiment is shown as a one-side copying apparatus, this does not preclude the apparatus from being the both-side copy type as shown in FIG. 1.

Figure 3:
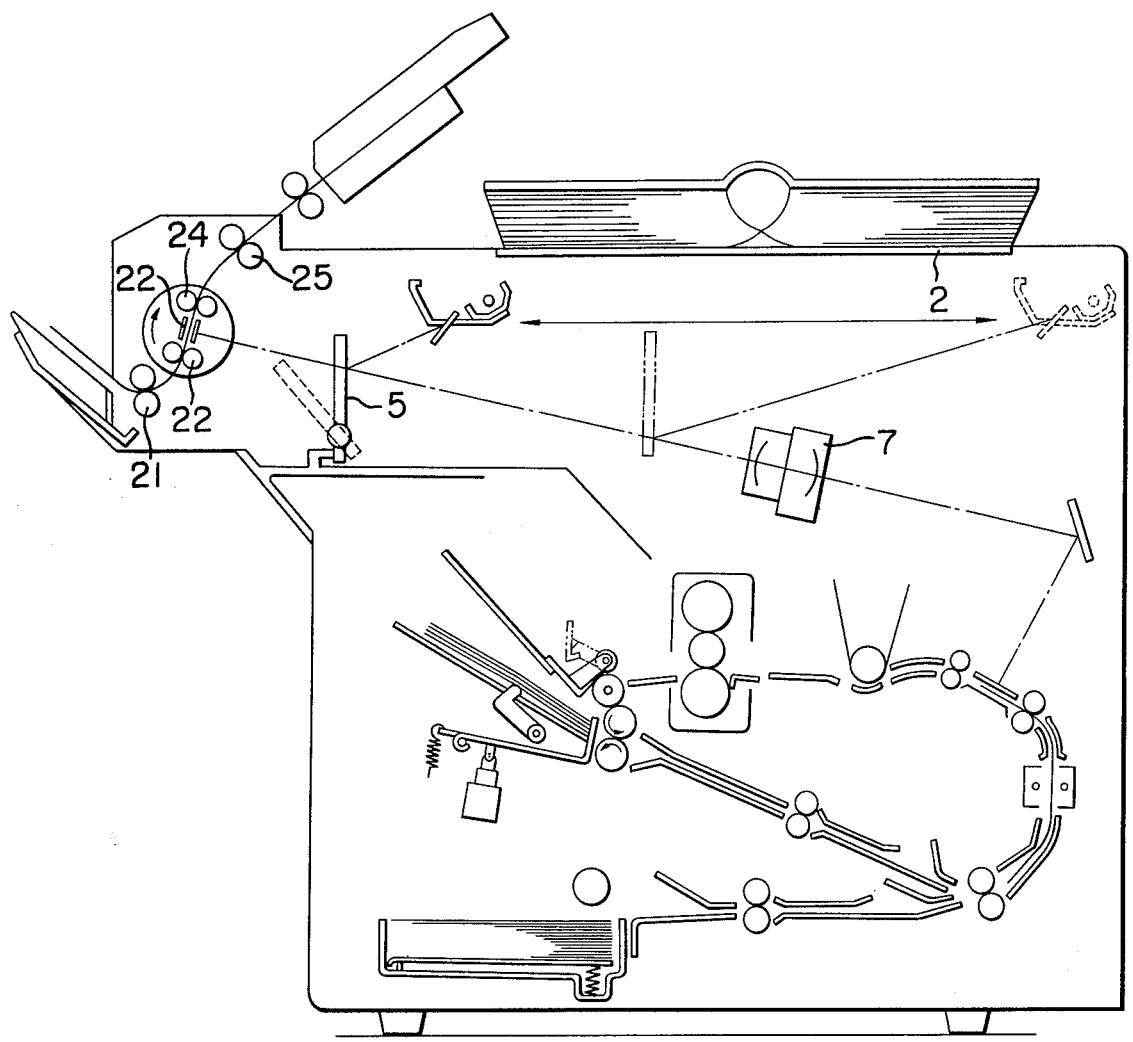
FIG. 3 is a cross-sectional view showing an embodiment of the present invention as applied to a fax type copying apparatus.

FIG. 3 is a cross-sectional view which shows that the invention is also applicable to the so-called fax type copying apparatus.

Like the other embodiments, this embodiment may be of the movable book-original carriage type, the variable magnification type using the lens movement or the one-side copy type.

What is claimed is:

1. A copying apparatus comprising in combination:
   sheet original transport unit for moving a sheet original from a sheet original inlet to a sheet original outlet, and having a scanning section disposed between said inlet and outlet;
   optical means including a lens and a mirror for projecting a scanned image of the original onto a photosensitive member to form a latent image thereon;
   means for revolving said sheet original transport unit with the trailing end portion of the sheet original being held therein downstream of said scanning section, wherein said revolving movement is effected so as to return the trailing end portion of the sheet original to a position adjacent said sheet original inlet through which the sheet original has been transported;
   means for reversely transporting the sheet original through said transport unit, with the trailing end portion thereof forward, from said sheet original inlet, past said scanning section, to said sheet original outlet; and
   means for visualizing the latent image projected on the photosensitive member.

2. A copying apparatus according to claim 1, wherein the lens of said optical means is movable to change image magnification.

3. A copying apparatus according to claim 1, further comprising means for transferring the image visualized on the photosensitive member onto one side of a copying material, and means for reversing the copying material having a visualized image on one side thereof and for returning the copying material to the transferring means to produce a both-sided copy.

4. A copying apparatus according to claim 1, further comprising an original holder for holding a thick original to be scanned in a thick original copying mode, said optical means further comprising a movable mirror being shiftable between first and second positions selectively for the thick original copying mode and the sheet original copying mode.

5. A copying apparatus according to claim 4, wherein said movable mirror is disposed at said first position along an image projection line in the thick original copying mode and is rotatably moved to said second position spaced from the image projection line during the sheet original copying mode.

* * * * *

UNITED STATES PATENT OFFICE
CERTIFICATE OF CORRECTION

Patent No. 4,110,030     Dated August 28, 1978

Inventor(s) WILHELM KNECHTEL

It is certified that error appears in the above-identified patent and that said Letters Patent are hereby corrected as shown below:

Column 1, lines 18 and 19, "that does not" should read --that it does not--;

Column 1, line 67, "copy of a" should read --copy by a--.

Signed and Sealed this

First Day of May 1979

[SEAL]

Attest:

RUTH C. MASON
*Attesting Officer*

DONALD W. BANNER
*Commissioner of Patents and Trademarks*